United States Patent [19]

Funahashi

[11] Patent Number: 5,319,452
[45] Date of Patent: Jun. 7, 1994

[54] CONTROL SYSTEM FOR CONCENTRATIVELY CONTROLLING A PLURALITY OF MUSIC ACCOMPANYING APPARATUSES

[75] Inventor: Yasuhiro Funahashi, Nagoya, Japan

[73] Assignee: Brother Kogyo Kabushiki Kaisha, Nagoya, Japan

[21] Appl. No.: 980,764

[22] Filed: Nov. 24, 1992

[30] Foreign Application Priority Data

Nov. 26, 1991 [JP] Japan .................................. 3-310511
Jun. 15, 1992 [JP] Japan .................................. 4-155220

[51] Int. Cl.$^5$ .............................................. H04N 5/78
[52] U.S. Cl. ........................................ 348/6; 358/335;
358/341; 358/343; 358/342; 358/311; 84/609;
84/610; 84/464 R
[58] Field of Search ............... 358/335, 341, 343, 311,
358/83, 102; 340/701, 702, 825.11, 825.01;
434/307, 308, 315, 316; 84/464 R, 464 A, DIG.
6, 609, 610; H04N 5/222, 5/78

[56] References Cited

U.S. PATENT DOCUMENTS

| | | | |
|---|---|---|---|
| 4,052,798 | 10/1977 | Tomita et al. .................. | 434/307 |
| 4,589,786 | 5/1986 | Fukui . | |
| 4,675,568 | 6/1987 | Uchikawa et al. . | |
| 4,949,187 | 8/1990 | Cohen ............................. | 358/335 |
| 5,131,311 | 6/1992 | Murakani et al. ............. | 84/609 |
| 5,233,438 | 8/1993 | Funahashi et al. ............ | 358/341 |

FOREIGN PATENT DOCUMENTS 0409224 1/1991 European Pat. Off. .
2249999 5/1992 United Kingdom .

OTHER PUBLICATIONS

Patent Abstarct of Japan vol. 9, No. 245 (M-418) Oct. 2, 1985, & JP-A-60 097 864 (Matsushita) May 31, 1985.
Patent Abstract of Japan vol. 10, No. 381 (M-547)(2438) Dec. 19, 1986. & JP-A-61 172 750 (Fuji) Aug. 4, 1986.
Communication dated Aug. 6, 1993; European Search report Application No. 92 30 8560 dated Jul. 23, 1993.
U.S. Patent Application No. 07/663,672 filed Mar. 4, 1991.

*Primary Examiner*—Victor R. Kostak
*Assistant Examiner*—Nathan J. Flynn
*Attorney, Agent, or Firm*—Kane, Dalsimer, Sullivan, Kurucz, Levy, Eisele and Richard

[57] ABSTRACT

The music number is input through the panel switch arranged in the music accompanying apparatus. The modulated music number signal by the modulation-demodulation device is transmitted to the control apparatus through the coaxial cable. In the control apparatus, the music number data signal is received through the coaxial cable, and further demodulated into the music number data by the modulation-demodulation device. The controller reads out the various music data. At the same time, the controller controls the four video disc devices so that the four video picture data each of which is corresponded to the different music genre, are reproduced by the video disc devices. Thereafter, both the various music data and the four video picture data are mutually superimposed through the head amplifier after modulated by each of the modulators and transmitted to each of the music accompanying apparatuses through the coaxial cable. In the music accompanying apparatus, one of the four video picture data is selected by the video tuner based on the song tone data and both the video picture and the song text are displayed on the video monitor at the same time through picture synthesizing circuit.

22 Claims, 8 Drawing Sheets

CONTROL SYSTEM FOR CONCENTRATIVELY CONTROLLING A PLURALITY OF MUSIC ACCOMPANYING APPARATUSES

BACKGROUND OF THE INVENTION

1. Field of the Invention

The present invention relates to a control system for concentratively controlling a plurality of music accompanying apparatuses, each having a video monitor, and particularly relates to the control system including a control apparatus having a video picture signal source through which video picture signals are commonably provided for each of the music accompanying apparatuses.

2. Description of Related Art

Conventionally, as the control system for concentratively controlling a plurality of the music accompanying apparatuses each of which has a video monitor, a player system including an auto-exchanger in which many video discs having the recorded video picture data thereon are stored, is generally utilized. Here, the number of the player system is usually set less than the number of the music accompanying apparatuses to a extent that there does not occur any problems at the music accompanying apparatus side. The reason is that the player system can handle a case in which the same music number (song) is selected at the same time by the plural music accompanying apparatuses.

However, in such player system, over one hundred video discs are stored, thus, the player system becomes very big scale. Thus, in case that the number of the player system is set extremely less than the number of the music accompanying apparatus, there will often occur a case in which the player system cannot provide the video picture data with some of the music accompanying apparatuses when the same music number is simultaneously selected by the plural music accompanying apparatuses. Therefore, if the number of the music accompanying apparatus becomes more than the number of the player system, it is necessary to prepare many of the big player systems. As a result, a control compartment with wide area has to be retained for the player systems, therefore, the cost becomes very expensive.

As mentioned above, in case that the player systems are installed in the control compartment with wide area according to the number of the music accompanying apparatus, there are problems that the wide control compartment has to be retained and the cost therefor inevitably becomes expensive. Additionally, the player system has to be seriously changed in the future if the video discs continuously released could not be stored in the auto-exchanger of the player system.

SUMMARY OF THE INVENTION

Accordingly, it is an object of the present invention to overcome the above mentioned problems and to provide a control system of low cost with a compact size in which the video picture data classified corresponding to the song tone, the song category or the genre of the song, can be simultaneously provided for each of the plural music accompanying apparatuses without increasing the number of the player systems if the number of the music accompanying apparatus is increased and further, such video picture data can be provided for each of the music accompanying apparatuses without increasing the number of the video disc if the newly released music is continuously added. Thereby, the size of the control system can be miniaturized and it will be unnecessary so wide area for the control compartment where the control system is installed.

In order to accomplish the above object, the present invention comprises a control system including a control apparatus and a plurality of music accompanying apparatuses, comprising;

a video picture providing means arranged in the control apparatus, for simultaneously providing a plurality of video picture signals each of which is corresponded to a different music genre for each of the music accompanying apparatuses, a music selecting means arranged in the music accompanying apparatus, for selecting a music number, a video picture selecting means arranged in the music accompanying apparatus, for selecting one video picture signal provided from the video picture providing means based on the genre of the music selected by the music selecting means.

In the control system of the present invention, a plurality of the video picture signals each of which is corresponded to the different music genre, are provided for each of the music accompanying apparatuses through the video picture providing means arranged in the control apparatus. On the other hand, at the music accompanying apparatus side, the music is selected by the music selecting means and thereafter one video picture signal provided from the video picture providing means is selected by the video picture selecting means, based on the genre of the music selected through the music selecting means.

Therefore, according to the control system of the present invention, the video pictures provided from the video picture providing means can be commonably utilized for each of the music accompanying apparatuses at the same time. Thus, since it is enough to retain the video picture data corresponding to the number of the music genre at the control apparatus, quantity of the video picture data to be retained by the control apparatus can be reduced, and thereby the control apparatus can be miniaturized. According to this, as a result, the control compartment for the control apparatus can be miniaturized, and further the cost for maintaining the control system can be extremely reduced.

Further, in each of the music accompanying apparatuses, it is unnecessary to have a reproducer for reproducing the video picture, therefore, the music accompanying apparatus can be simply constructed.

The above and further objects and novel features of the present invention will more fully appear from the following detailed description when the same is read in connection with the accompanying drawings. It is to be expressly understood, however, that the drawings are for purpose of illustration only and not instead as a definition of the limits of the invention.

BRIEF DESCRIPTION OF THE DRAWINGS

The invention will be described with reference to the following drawings, wherein.

DETAILED DESCRIPTION OF THE PREFERRED EMBODIMENTS

A detailed description of the preferred first embodiment of the control system including the control apparatus and a plurality of the music accompanying apparatuses will now be given referring to the accompanying drawings.

The control system which concentratively controls a plurality of music accompanying apparatuses will be described hereinafter, referring to FIGS. 1-4.

Figure 1:
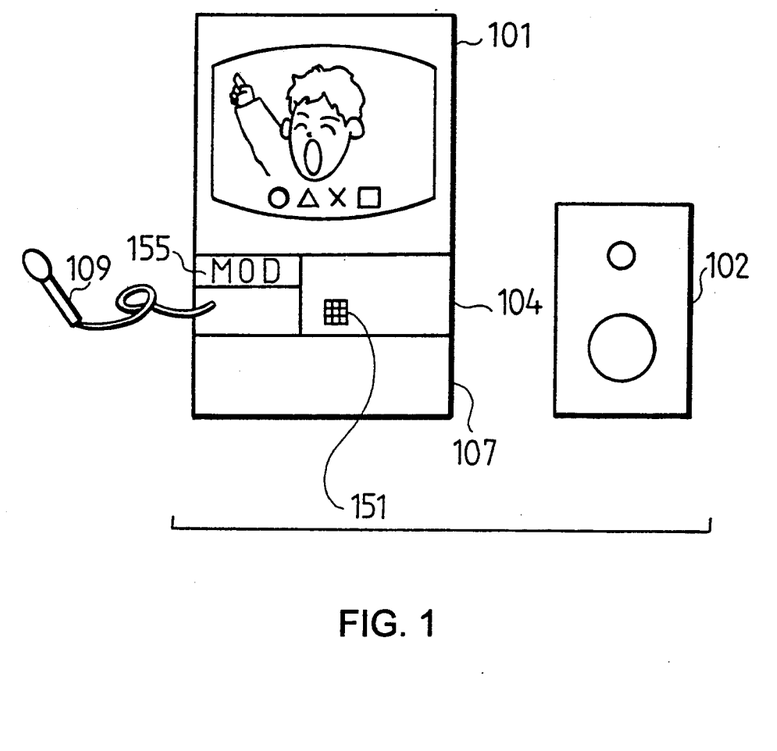
FIG. 1 is a schematic view of the music accompanying apparatus controlled by a control apparatus in the control system, according to the first embodiment of the present invention.

At first, the music accompanying apparatus controlled by the control apparatus (mentioned hereinafter) will be described according to FIGS. 1 and 3. In FIG. 1, the music accompanying apparatus essentially comprises a video monitor 101, a speaker 102, a video tuner 104, a modulation-demodulation device 155 and an audio amplifier 107. Here, the video monitor 101 displays a song text and a video picture at the same time thereon as mentioned hereinafter. The speaker 102 sounds a voice sung by the user through a microphone 109 connected to the audio amplifier 107 and an accompaniment music transmitted from the control apparatus shown in FIG. 3. And the video tuner 104 has a panel switch 151 on the front side thereof, and through the panel switch 151, the user selects one of channels, each being corresponded to a video picture classified according to a genre of the accompaniment music transmitted from the control apparatus. Further, the modulation-demodulation device 155 transmits information of the selected music number and receives music data through radio frequency (RF) signal. The audio amplifier 107 converts both the voice signal from the microphone 109 and the accompaniment music signal into the acoustic signal.

Figure 2:
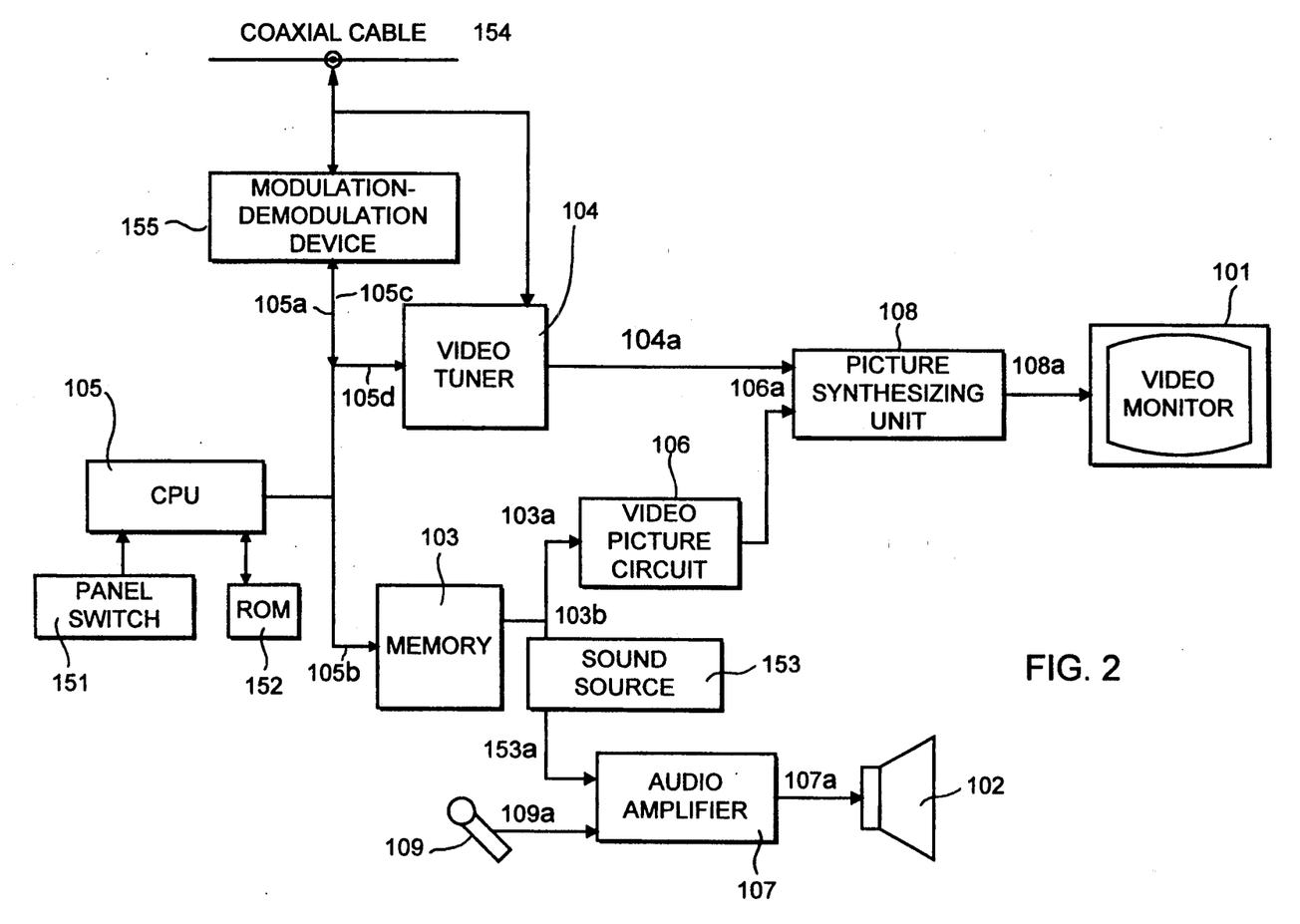
FIG. 2 is a block diagram of the music accompanying apparatus shown in FIG. 1.

Following to the above, electric construction of the music accompanying apparatus will be described hereinafter. In FIG. 2, the apparatus is essentially controlled by a CPU 105. The panel switch 151 is connected to the CPU 105, thereby the CPU 105 recognizes the music number based on the input data through the panel switch 151 and stores the input data in a memory 103 (described hereinafter). And a ROM 152 is connected to the CPU 105. The ROM 152 stores various control programs necessary to control the music accompanying apparatus. The CPU 105 controls the apparatus according to the control programs stored in the ROM 152.

To the CPU 105, the modulation-demodulation device 155 and the video tuner 104 are parallel connected and further both are connected to a coaxial cable 154 which is connected to the control apparatus. Here, the modulation-demodulation device 155 modulates the music number data 105a input through the panel switch 151 into the RF signal with the first frequency and transmits it to the control apparatus through the coaxial cable 154, under control by the CPU 105. Additionally, the modulation-demodulation device 155 demodulates the RF signal, which includes a music data 105b including a song text data 103a and an accompaniment music data 103b, a selected music number data 105c, a song tone data 105d and four video picture data, each being modulated into the RF signal with the second frequency and transmitted from the control apparatus, as mentioned after.

The video tuner 104 directly receives the RF signal with the second frequency of the four video picture data from the coaxial cable 154 and the selected music number data 105c with the song tone data 105d demodulated by the modulation-demodulation device 155. And the video tuner 104 selects one video picture data among the four video picture data according to the song tone data 105d, and further reads out the selected video picture data. Thereafter, the video tuner 104 outputs the selected video picture data 104a to a picture synthesizing circuit 108 connected thereto.

And a memory 103 is connected to the CPU 105 and further, a video picture circuit 106 connected to a picture synthesizing circuit 108 and a sound source 153 connected to an audio amplifier 107 are parallel connected to the memory 103. The CPU 105 temporarily stores the music data 105b including the song text data 103a and the accompaniment music data 103b in the memory 103 when received from the modulation-demodulation device 155. Thereafter, the CPU 105 synchronously outputs both the data 103a and 103b to the video picture circuit 106 and to the sound source 153, respectively.

Thereby, the video picture circuit 106 converts the song text data 103a into a text picture data 106a and outputs it to the picture synthesizing circuit 108. The picture synthesizing circuit 108 synthesizes the selected video picture data 104a from the video tuner 104 and the text picture data 106a into one picture signal 108a and outputs the synthesized picture signal 108a to the video monitor 101 connected thereto. Thus, the video monitor 101 displays the video picture and the song text thereon at the same time.

On the other hand, the sound source 153 converts the accompaniment music data 103b into an acoustic signal 153a and outputs it to the audio amplifier 107. The audio amplifier 107 mixes the acoustic signal 153a and a voice signal 109a from the microphone 109, into a mixed sound signal 107a and further outputs the mixed sound signal 107a to the speaker 102 after amplifying thereof. Thus, the speaker 102 sounds the accompaniment music and the voice sung by the user at the same time.

Next, referring to FIGS. 3 and 4, the control apparatus which controls the above music accompanying apparatus will be described hereinafter. In FIG. 3, the control apparatus is wholly controlled through a controller 160 which has well-known CPU, ROM and RAM. To the controller 160, four video disc devices 161 are parallel connected. The controller 160 outputs control signal 160a to each video disc device 161, thereby controls each video disc device 161. Here, each video disc device 161 is corresponded to one of four genres (mentioned hereinafter) and reproduces the video picture data 161a from a CD set therein, the video picture data 161a being video signal formed according to National Television System Committee (NTSC) standard and classified according to the song tone (song genre, mentioned hereinafter).

Each video disc device 161 is parallel connected to a head amplifier 166 through a modulator 164. The modulator 164 converts the video picture data from the video disc device 161 into the RF signal 164a in the frequency band inherent in each channel corresponding to the video picture. Concretely, each of the four modulators 164 modulates the video picture data output from each of the four video disc devices 161 into the RF signal 164a with the third frequency, the RF signal 164a with the fourth frequency, the RF signal 164a with the fifth frequency and the RF signal 164a with the sixth frequency, respectively, according to the music genre. Thereafter, each modulator 164 outputs it to the head amplifier 166. Here, the head amplifier 166 is able to superimpose the RF signals 164a of the video picture data and the RF signal 165a (mentioned hereinafter) obtained by converting the music data 105b, the music number data 105c and the song tone data 105d. And the head amplifier 166 is connected to the coaxial cable 154 which is joined to the music accompanying apparatus mentioned above.

And a memory device 163 is connected to the controller 160. The controller 160 controls reading out operation from the memory device 163 through the memory control signal 160c.

Here, in the memory device 163, a data table of the music data 105b including the song text data 103a and the accompaniment music data 103b, the selected music number data 105c and the song tone data 105d, each data being mutually corresponded, is stored. The selected music number data 105c which is corresponded to the music number data 105a input through the panel switch 151, represents the music number such as the song 1, the song 2 . . . the song 9, the song 10. And the song tone data 105d has four kinds of song tone codes "0", "1", "2" and "3", and one song tone code is allotted to each music number. Here, as clearly understood from the table shown in FIG. 4, the music number with the song tone code "0" belongs to the genre of the Japanese pops song. The music number with the song tone code "1" belongs to the genre of the folk song. And similarly, the music number with the song tone code "2" belongs to the genre of the country & western music song, further the music number with the song tone code "3" belongs to the genre of the jazz song. Additionally, as mentioned above, the music data 105b includes the song text data 103a and the accompaniment music data 103b. Here, the RF signal with the first frequency is allotted to the music number data 105c which is corresponded to the music number data 105a output through the panel switch 151 and the RF signal with the second frequency is allotted to both the music data 105b and the song tone data 105d.

Further, a data input/output (I/O) device 162 and a modulation-demodulation device 165 are connected between the controller 160 and the head amplifier 166. The modulation-demodulation device 165 is able to demodulate the RF signal with the first frequency of the music number data 105a and modulate the music data 105b, the music number data 105c and the song tone data 105d read out from the memory device 163 into the RF signal with the second frequency. Thus, when the RF signal of the music number data 105a is input to the control apparatus from the music accompanying apparatus through the coaxial cable 154, head amplifier 166, the modulation-demodulation device 165 and the data I/O device 162, the controller 160 reads out from the memory device 163 the music data 105b, the music number data 105c and the song tone data 105d based on the data 105a. And the controller 160 controls the data I/O device 162 and the modulation-demodulation device 165 through the control signal 160b so that the RF signal 165a of both the music data 105b and the music number data 105c read out from the memory device 163 are input to the head amplifier 166. On the other hand, the controller 160 controls the video disc devices 161 and the modulators 164 so that the RF signals 164a of the video picture are input to the head amplifier 166.

In the head amplifier 166, the RF signals 164a, 165a from the modulator 164, the modulation-demodulation device 165 are superimposed each other and transmitted to the music accompanying apparatus through the coaxial cable 154.

Next, operation of the above constructed control apparatus will be described hereinafter. At first, when the music number data 105a is input to the CPU 105 through the panel switch 151, the CPU 105 outputs the RF signal with the first frequency modulated by the modulation-demodulation device 155 to the control apparatus through the coaxial cable 154. In the control apparatus, if the controller 160 receives the music number data 105a (which is obtained by demodulating the RF signal of the music number data 105a passing through the head amplifier 166 in the modulation-demodulation device 165 and input to the controller 160 through the data I/O device 162), the music data 105b, the music number data 105c and the song tone data 105d are read out from the data table stored in the memory device 163 according to the received music number data 105a.

And the RF signals 165a with the second frequency of the music data 105b, the music number data 105c and the song tone data 105d modulated by the modulation-demodulation device 165 after passing through the data I/O device 162, are input to the head amplifier 166. At the same time, the video disc devices 161 are controlled by the controller 160 and the RF signals 164a of the four video picture data modulated by the modulators 164 (each RF signal 164a having the third frequency, the fourth frequency, the fifth frequency and the sixth frequency, respectively) are input to the head amplifier 166. Thereafter, both the RF signals 165a and 164a are mutually superimposed and transmitted to the music accompanying apparatus through the coaxial cable 154.

In the music accompanying apparatus, the RF signals of the video picture are directly input to the video tuner 104 and the music number data 105c which is demodulated by the modulation-demodulation device 155 is input to the video tuner 104. The video tuner 104 selects one video picture data among the four video picture data according to the music number data 105c and the song tone data 105d, and further reads out the selected video picture data. Thereafter, the video tuner 104 outputs the selected video picture data 104a to the picture synthesizing circuit 108 connected thereto.

On the other hand, the music data 105b which is obtained by demodulating the RF signal with the second frequency from the coaxial cable 154 by the modulation-demodulation device 155, is temporarily stored in the memory 103 under control by the CPU 105. And the song text data 103a included in the music data 105 is input to the video picture circuit 106 and thereafter is converted into the text picture data 106a through the video picture circuit 106. The text picture data 106a is input to the picture synthesizing circuit 108. In the picture synthesizing circuit 108, the video picture data 104a and the text picture data 106a are synthesized into one picture signal 108a which is input to the video monitor 101. As a result, the video monitor 101 displays the video picture and the song text thereon at the same time, as shown in FIG. 1. Understandable from FIG. 1, the video picture and the song text are displayed on the video monitor 101 with superimposed state.

The accompaniment music data 103b is converted into the acoustic signal 153a by the sound source 153 and input to the audio amplifier 107. At the same time, the voice signal 109a from the microphone 109 is input to the audio amplifier 107. Thereby, the audio amplifier 107 mixes both the acoustic signal 153a and the voice signal 109a into the sound signal 107a and the speaker 102 sounds the accompaniment music and the voice sung by the user based on the sound signal 107a. At this time, the video picture and the song text are displayed on the video monitor 101 synchronously with the both the accompaniment music and the voice sounded from the speaker 102.

Here, a plurality of the music accompanying apparatuses, each of the apparatuses having a ID number to identify thereof, are connected to the one control apparatus through the coaxial cable 154. And the controller 160 in the control apparatus repeats polling of each music accompanying apparatus for a predetermined period while specifying the music accompanying apparatus.

Figure 3:
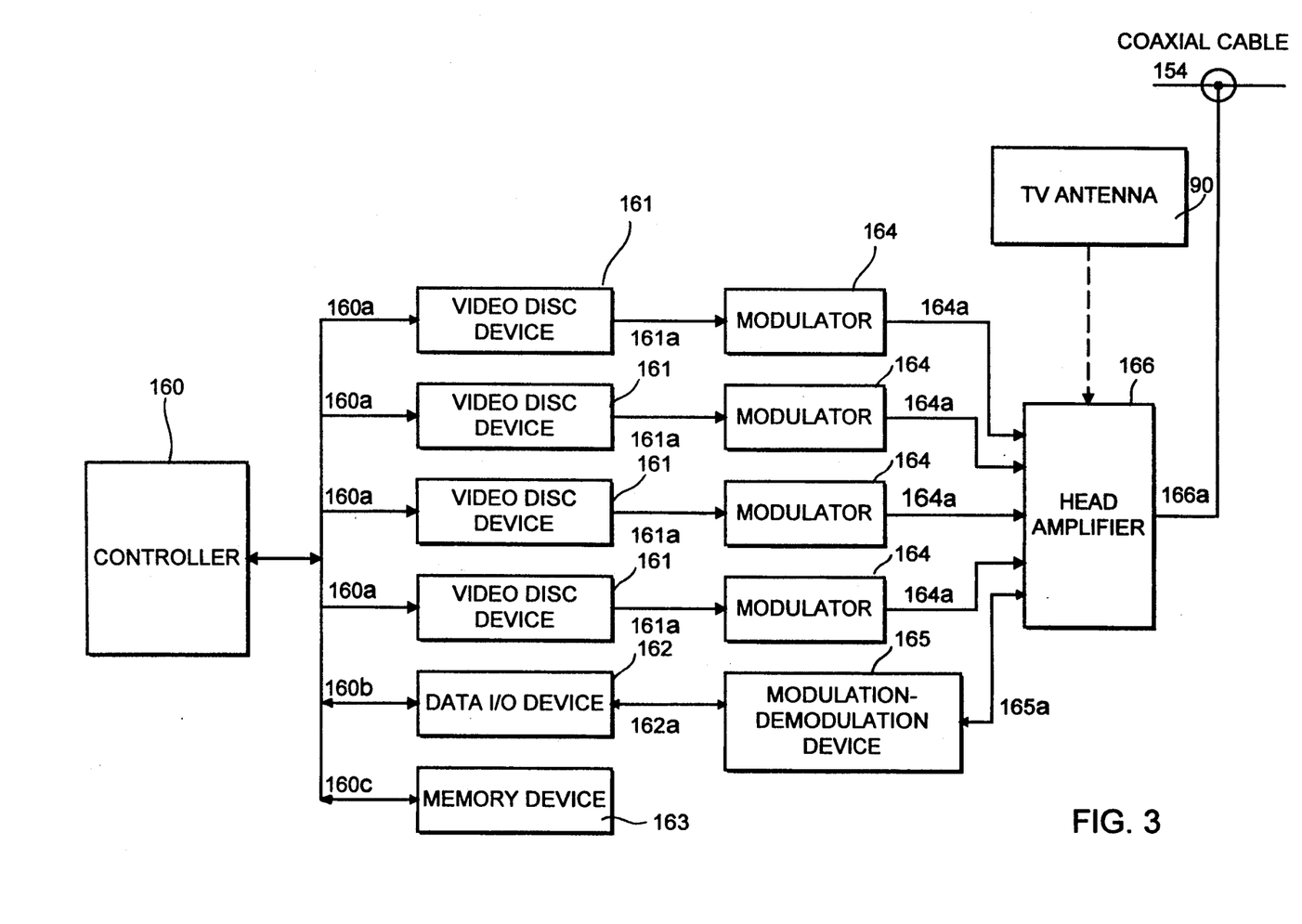
FIG. 3 is a block diagram of the control apparatus according to the first embodiment of present invention.
Figure 4:
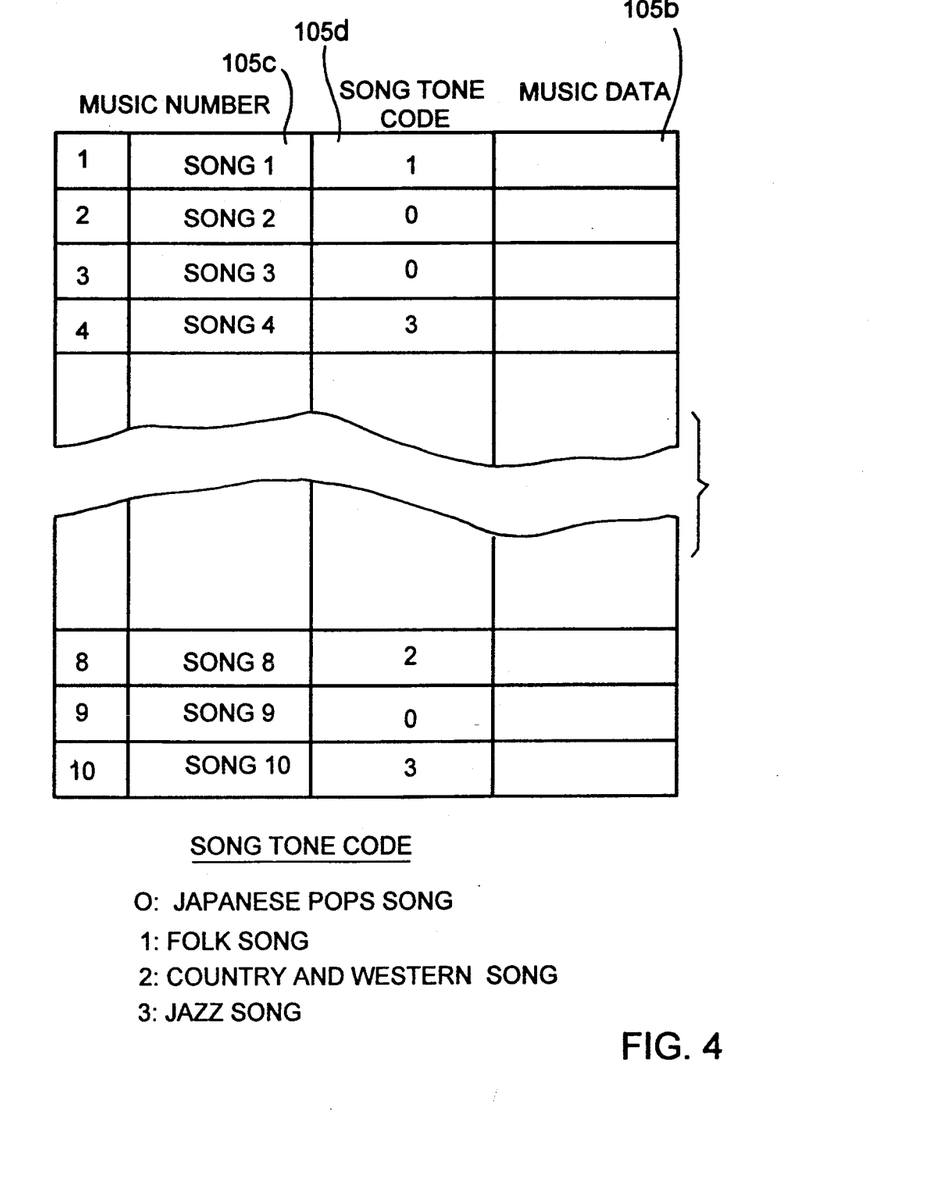
FIG. 4 is a schematic view of a table stored in a memory device of the control apparatus shown in FIG. 3, which shows a relation between song numbers and the song tone.

And in the control apparatus, if an antenna 90 for receiving television broadcast is connected to the head amplifier 166 as shown in FIG. 3, the control apparatus can transmit the video picture signals received through the antenna 90 to each of the music accompanying apparatus. That is, the television antenna 90 may also be provided for receiving a television broadcast and transmitting the video signals corresponding to the television broadcast received thereby to the music accompanying apparatus through the coaxial cable 154, as shown in FIG. 3.

As mentioned above, at the control apparatus side, the four video picture data are reproduced from the video disc by the video disc devices 161 and the other data except for the video picture data, such as the music data 105b including the song text data 103a and the accompaniment music data 103b, the music number data 105c, the song tone data 105d, are stored in the memory device 163 separately from the video picture data. And the above all data modulated into the RF signal with inherent frequency are transmitted to the music accompanying apparatus through the coaxial cable 154.

Further, at the music accompanying apparatus side, both the video picture data selected by the video tuner 104 based on the music number data 105c and the song tone data 105d, and the song text data 103a, are displayed on the video monitor 101 at the same time. And both the acoustic signal 153a obtained from the accompaniment music data 103b and the voice signal 109a input from the microphone 109 are sounded from the speaker 102 through the audio amplifier 107.

Therefore, the video picture data can be commonably utilized for the music (song) number with the substantially same song tone. Thus, it is unnecessary to record the video picture data every the song number and the data quantity to be recorded on the video disc can be reduced. This leads that the video disc size can be miniaturized. As a result, the size of the control apparatus can be miniaturized and it will be unnecessary so wide area for the control compartment where the control apparatus is installed.

For instance, such control system can be effectively utilized in the hotel which has many guest rooms. In this case, the control apparatus is installed in the control compartment located near the front desk and each music accompanying apparatus is set in each guest room. And when the guest (user) uses the music accompanying apparatus, both the bideo picture corresponding to the song tone and the song text are displayed on the video monitor at the same time, and further the accompaniment music is sounded from the speaker by inputting the music (song) number through the panel switch. Therefore, the guest can enjoy singing without troublesome operation of the apparatus.

Similarly, in case that a plurality of the televisions are arranged in one building and each television is mutually connected through the common coaxial cable, each television can be utilized as the video monitor of the music accompanying apparatus by only connecting the control apparatus to the common coaxial cable without new wiring works.

And in the control system according to the above first embodiment, since a plurality of the video picture signals formed under NSTC standard are respectively modulated into the RF signals and the modulated RF signals are transmitted to the music accompanying apparatus, both the control apparatus and the music accompanying apparatus can be connected each other through one common coaxial cable.

Further, since the video picture signal reproduced by one video disc device is simultaneously received by each music accompanying apparatus and the reproduction of the accompaniment music is conducted by the music accompanying apparatus based on the music data and the song tone data transmitted from the control apparatus, the control system of the first embodiment can readily handle the case in which the same music number is simultaneously selected by the plural music accompanying apparatuses.

Next, a detailed description of the preferred second embodiment of the control system including the control apparatus and a plurality of the music accompanying apparatuses will now be given referring to the accompanying drawings.

The control system according to the second embodiment will be described hereinafter, referring to FIGS. 5-9.

Figure 5:
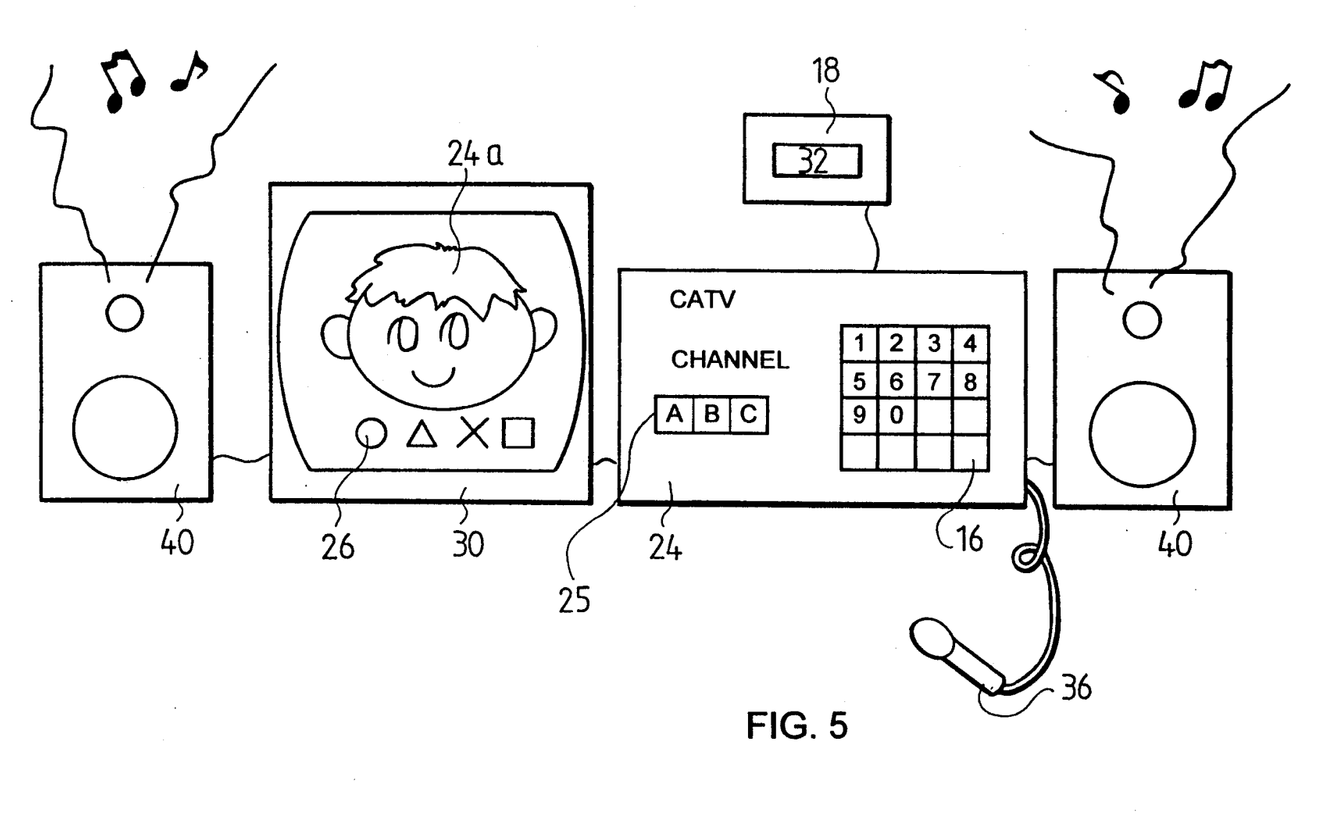
FIG. 5 is a schematic view of the music accompanying apparatus according to the second embodiment of the present invention.

At first, the music accompanying apparatus controlled by the control apparatus (mentioned hereinafter) will be described according to FIGS. 5 and 8.

The music accompanying apparatus is essentially comprised of a cable television tuner (abbreviated as CATV tuner hereinafter) 24, a compact disc player (abbreviated as CD player hereinafter) 18 connected to the CATV tuner 24, a video monitor 30 and a pair of speakers 40, each being mutually connected to the CATV tuner 24.

Here, the CATV tuner 24 receives three video pictures transmitted from a coaxial cable 80 through the control apparatus (mentioned hereinafter), each video picture corresponding to a channel A, a channel B and a channel C (mentioned hereinafter).

And on the front panel of the CATV tuner 24, a panel switch 16 and a channel indicator 25 are arranged. The panel switch 16 is utilized when the user selects desiring song number to sing. And the channel indicator 25 has three indicating lamps each of which corresponds to the channel A, B and C, and lights one of indicating lamps according to the selected channel through a channel selector 22 (mentioned hereinafter).

And in the CD player 18, a CD 32 on which music data 18c (the music data 18c comprising of a song text data 18a, a song tone data 50 and an accompaniment music data 18b, as mentioned hereinafter) is recorded, is set and both the song text 26a played back by the CD player 18 and the video picture 24a received by the CATV tuner 24 according to the selected channel are displayed on the video monitor 30 at the same time. Further, the accompaniment music played back by the CD player 18 based on the accompaniment music data 18b recorded on the CD 32 and voice sung by the user through a microphone 36 connected to the CATV tuner 24, are output from the speakers 40.

Figure 7:
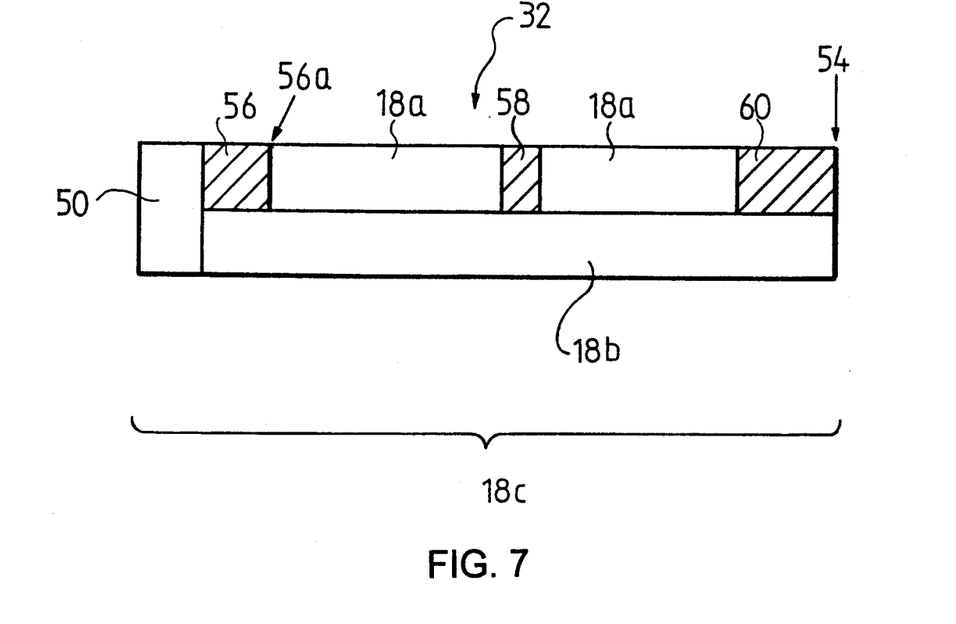
FIG. 7 is a schematic view which shows the data area recorded on the video disc.

Here, referring to FIG. 7, the music data 18c recorded on the CD 32 will be described. In FIG. 7, the area construction of the music data 18c per one song is schematically shown. At first area (left area in FIG. 7), the song tone data 50 is recorded. Continuous to the song tone data 50, two recording area are formed parallel with each other. In one area (lower area in FIG. 7), the accompaniment music data 18b is recorded. And in the other area (upper area in FIG. 7), two of the song text data 18a are intermittently recorded and a prelude part 56, a interlude part 58 and an ending part 60, in each of which the song text data is not recorded, are formed between the song text data 18a. And index 56a represents a start position to sing.

Figure 6:
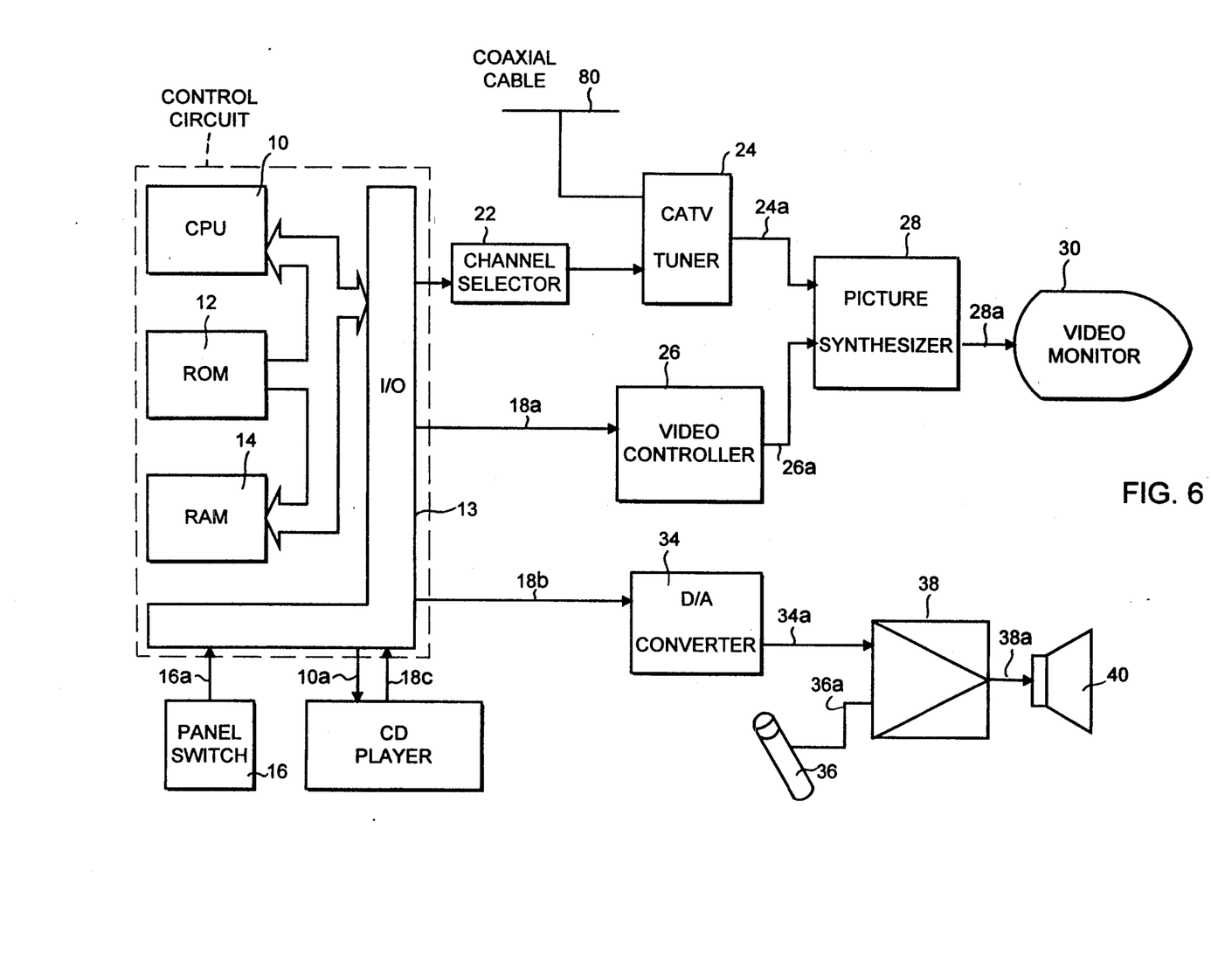
FIG. 6 is a block diagram of the music accompanying apparatus shown in FIG. 5.

Next, electric construction of the music accompanying apparatus will be described referring to FIG. 6. In FIG. 6, control circuit includes a CPU 10 which wholly controls the music accompanying apparatus, a ROM 12 in which control programs necessary to control the apparatus is stored, a RAM 14 which temporarily stores the music data 18c, etc. (mentioned hereinafter) and a I/O interface 13, each being mutually connected through bass line.

Figure 8:
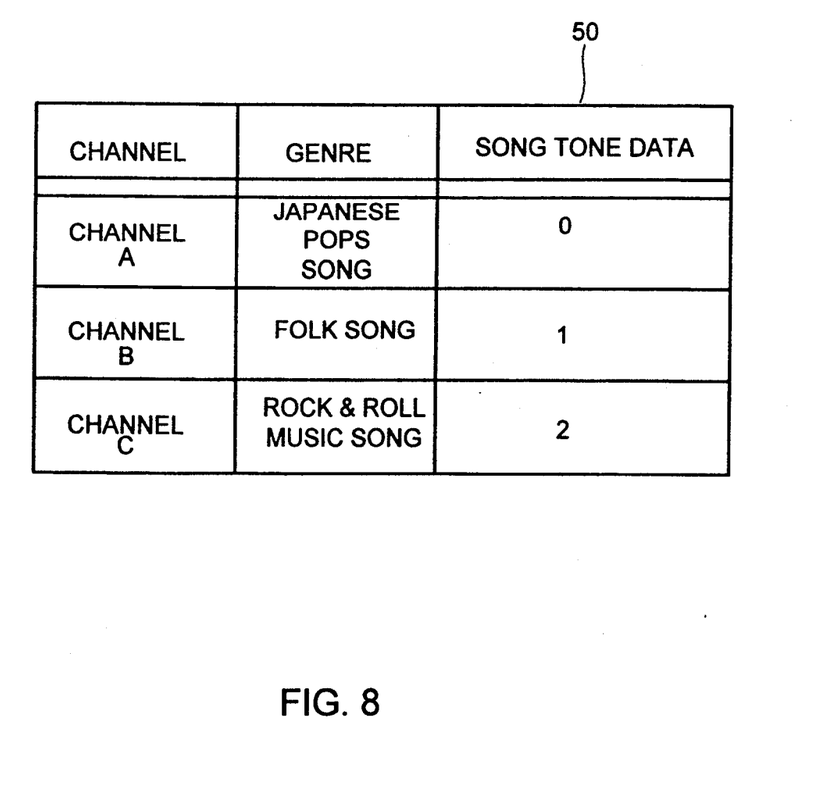
FIG. 8 is a schematic view of a table stored in a ROM of the music accompanying apparatus shown in FIG. 6, which shows a relation between channels of cable television and data representing the song tone.

Here, as shown in FIG. 8, in addition to the control programs, a table in which each channel A, B and C of CATV and data representing the song tone data according to the genre thereof are related each other, is stored in the ROM 12. In FIG. 8, the video picture received through the channel A corresponds to the Japanese pops song and the song tone data is defined as "0". And the video picture received through the channel B corresponds to the folk song and the song tone data is defined as "1". Further, the video picture received through the channel C corresponds to the rock & roll music song and the song tone data is defined as "2".

Again referring to FIG. 6, the panel switch 16 and the CD player 18 which plays back the above music data 18c recorded on the CD 32 set therein, are connected to the I/O interface 13. And the music data 18c read out from the CD 32 by the CD player 18 is temporarily stored in the RAM 14.

An input terminal of a channel selector 22 is connected to the I/O interface 13 and an output terminal thereof is connected to the CATV tuner 24. Thus, the channel selector 22 selects one channel among the channels A, B and C of the CATV tuner 24 based on the song tone data 50 read out from the CD 32 under control by the CPU 10. The CATV tuner 24 receives the video picture signals with three channels A, B and C from the coaxial cable 80 connected to the control apparatus and selects the video picture signal according to the channel selected by the channel selector 22. Further, the CATV tuner 24 outputs the video picture signal 24a to an input terminal of a picture synthesizer 28.

An input terminal of a video controller 26 is connected to the I/O interface 13 and an output terminal thereof is connected to another input terminal of the picture synthesizer 28. Thus, the video controller 26 receives the song text data 18a in the music data 18c stored in the RAM 14 and converts the song text data into a song text picture signal, thereafter the video controller 26 outputs the song text picture signal 26a to the another input terminal of the picture synthesizer 28. And the picture synthesizer 28 synthesizes both the video picture signal 24a input from the CATV tuner 24 and the song text picture signal 26a input from the video controller 26 and thereafter outputs the synthesized picture signal to the video monitor 30. And the video monitor 30 displays the synthesized picture comprising of the video picture 24a and the song text 26a thereon, as shown in FIG. 5.

Further, an input terminal of a D/A converter 34 is connected to the I/O interface 13 and an output terminal thereof is connected to a sound input terminal of an audio amplifier 38 with mixing function. Thus, the D/A converter 34 receives the accompaniment music data 18b in the music data 18c stored in the RAM 14 and converts the accompaniment music data 18b into the accompaniment music signal 34a, thereafter outputs the accompaniment music signal 34a to the audio amplifier 38 through the sound input terminal thereof.

And the microphone 36 through which voice signal 36a of the user is input is connected to the another sound input terminal of the audio amplifier 38, therefore the audio amplifier 38 mixes the accompaniment music signal 34a from the D/A converter 34 and the voice signal 36a from the microphone 36 and outputs the acoustic signal 38a to the speakers 40. Further, the speakers 40 sounds the accompaniment music and the voice at the same time, based on the acoustic signal 38a.

Figure 9:
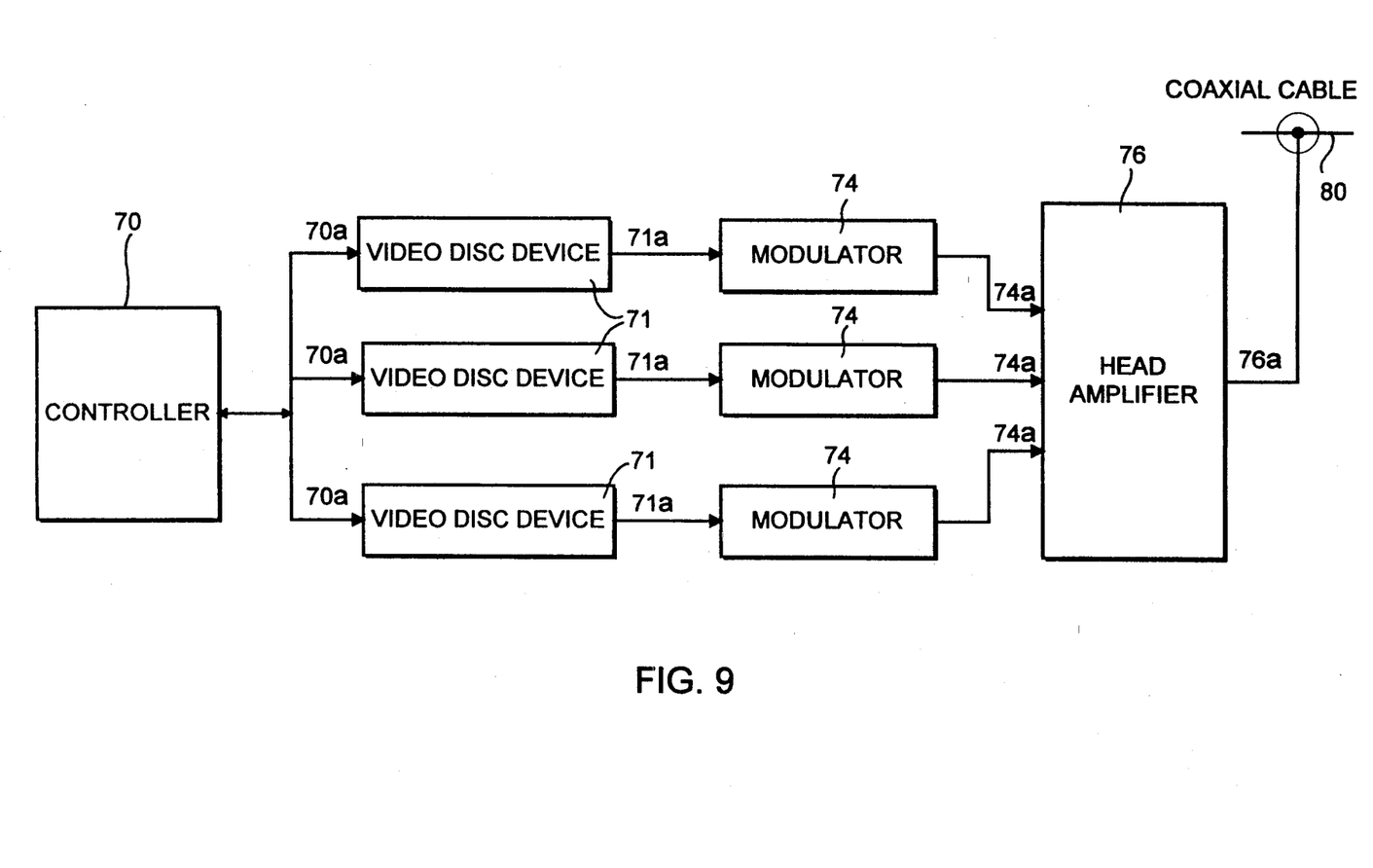
FIG. 9 is a block diagram of the control apparatus in the control system according to the second embodiment of the present invention.

Next, the control apparatus which controls the above constructed music accompanying apparatus shown in FIG. 6 will be described hereinafter, referring to FIG. 9.

The control apparatus according to the second embodiment has essentially the same electric construction as the control apparatus of the first embodiment shown in FIG. 3. The different point from the control apparatus of the first embodiment lies in that the I/O device 162, the memory device 163 and the modulation-demodulation device 165 are not arranged in the control apparatus of the second embodiment and only three pairs of the video disc device 71 and the modulator 74 are arranged therein. That is to say, the controller 70 controls three video disc devices 71, each video disc device 71 respectively corresponding to the channel A, the channel B and the channel C, through the control signal 70a at the same time, so that each video disc device 71 reproduces the video picture data 71a recorded on the video disc set therein. And all video picture data 71a are modulated by the modulators 74 into the RF signals 74a. Thereafter, the modulated RF signals 74a are superimposed into the RF signal 76a through the head amplifier 76 and further the RF signal 76a is transmitted to the music accompanying apparatus through the coaxial cable 80. Therefore, the RF signal 76a in which three video picture data 71a reproduced by the video disc devices 71 are superimposed, is continuously transmitted from the control apparatus to the music accompanying apparatus.

Additionally, operation of the above constructed apparatus will be described hereinafter. Here, the video picture received through the channel A corresponds to the Japanese pops song, the video picture through the channel B to the folk song and the video picture through the channel C to the rock & roll music song, as shown in FIG. 8.

At first, the user inputs the song number data 16a through the panel switch 16. When the CPU 10 receives the song number data 16a from the panel switch 16, it outputs the reading command 10a which corresponds to the input song number, to the CD player 18. The CD player 18 reads out the music data 18c from the CD 32 according to the reading command 10a and temprorarily stores the read out music data 18c in the RAM 14.

Thereafter, the CPU 10 recognizes the song tone data 50 positioned at the first area of the music data 18c and directs the channel selector 22 so that the selector 22 selects the channel corresponding to the song tone data 50. And the channel selector 22 outputs the selected channel information to the CATV tuner 24. The CATV tuner 24 selects the video picture signal among three video picture signals transmitted from the control apparatus, according to the selected channel information. For instance, in case that the song tone data 50 recognized by the CPU 10 is "2", the CPU 10 recognizes that the accompaniment music is the rock & roll music song, referring to the table shown in FIG. 8 and directs the channel selector 22 so that the selector 22 selects the channel C. Based on the direction from the channel selector 22, the CATV tuner 24 outputs the video picture signal 24a corresponding to the rock & roll music song, to the picture synthesizer 28.

Next, in order to start playing, the CPU 10 serially outputs the accompaniment music data 18b in the music data 18c stored in the RAM 14, to the D/A converter 34. The D/A converter 34 converts the accompaniment music data into the accompaniment music signal 34a and outputs such signal 34a to the audio amplifier 38. Thereafter, the audio amplifier 38 amplifies the accompaniment music signal 34a and sounds the speakers 40 according to the amplified accompaniment music signal.

On the other hand, when the accompaniment music data 18b advances to the start position 56a, the CPU 10 outputs the song text data 18a to the video controller 26. The video controller 26 generates the song text signal 26a based on the song text data 18a and outputs the signal 26a to the picture synthesizer 28. And the picture synthesizer 28 synthesizes the video picture signal 24a output from the CATV tuner 24 and the the song text signal 26a output from the video controller 26, into the video picture signal 28a. Thereafter, the picture synthesizer 28 outputs the video picture signal 28a to the video monitor 30 so that the video monitor 30 displays the video picture and the song text at the same time.

And the user starts singing through the microphone 36 when the song text is serially displayed on the video monitor 30. The voice input through the microphone 36 is converted into the voice signal 36a which is input to the audio amplifier 38. Further, the audio amplifier 38 mixes the accompaniment music signal 34a output from the D/A converter 34 and the voice signal 36a into the acoustic signal 38a. Thereby, the acoustic signal 38a is sounded through the speakers 40.

Thereafter, the CPU 10 continuously controls each device so that the song text data 18a is synchronized with the accomapniment music data 18b, and further not only displays both the video picture and the song text on the video monitor 30, but also sounds the speakers 40, at the same time.

While the invention has been particularly shown and described with reference to preferred embodiments thereof, it will be understood by those skilled in the art that the foregoing and other changes in form and details can be made therein without departing from the spirit and scope of the invention.

In the first embodiment, though the video disc on which the video picture data is recorded is utilized in the video disc device 161 of the control system, various video picture memory media such as a hard disc (CD-ROM) and a video tape, can be utilized in the control apparatus instead of the video disc mentioned above.

And in case that the music data is formed according to Musical Instrument Digital Interface (MIDI) standard, an information to display the song text can be included in the music data in addition to the music information. If the information according to MIDI standard is utilized, it is easy to construct a system in which the data is picked up from an external device through the telecommunication line and thereafter is read out and reproduced. Therefore, if the above system is utilized as the commercial use, new music data can be easily prepared with comparatively low cost for maintaining the system.

Further, in the second embodiment, for instance, instead that the song tone data 50 is recorded in the music data 18c, the same effect as in the above embodiment can be obtained if the channel data of the CATV is recorded in the music data 18c. In this case, it is unnecessary that the table shown in FIG. 4 has to be stored in the ROM 12.

And though the video picture signal 24a is automatically selected according to the song tone data in the above embodiment, it is conceivable that the user desirably selectes through a channel selecting switch arranged on the panel switch 16.

Further, though three channels A, B and C for selecting the video picture signals are given in the above embodiment as shown in FIG. 8, it is possible that only one channel is given. Though, in such case, it is impossible to select the video picture according to the song tone, it is enjoyable to sing with the video picture displayed on the video monitor 30.

Additionally, concerning with the song text data 18a in the music data 18c, if the song text signal 26a is directly recorded on the CD 32, the song text signal 26a can be directly input to the picture synthesizer 28 without through the video controller 26.

And though the CATV is utilized as the video picture source in the above embodiment, it can be understood that a ground wave broadcast transmitted from the public or private broadcast board, a broadcast through satellite and a picture data transmitted through fast communication network such as optical fibers are available as the video picture source. Further, the music accompanying apparatus is utilizable in the local area broadcast network.

What is claimed is:

1. A control system including a control apparatus for transmitting an accompaniment music and a plurality of music accompanying apparatuses, comprising:
   a video picture providing means arranged in the control apparatus, for simultaneously providing a plurality of video picture signals each of which is corresponded to a different music genre for each of the music accompanying apparatuses,
   a music selecting means arranged in the music accompanying apparatus, for selecting a genre of music to be transmitted in response to a user input,
   a video picture selecting means arranged in the music accompanying apparatus, for selecting one video picture signal provided from the video picture providing means based on the genre of the music selected by the music selecting means.

2. The control system according to claim 1, wherein the video picture providing means comprises a video picture data generating means for generating a plurality of video picture data each of which is corresponded to the different music genre, a first converting means for converting the video picture data into the video picture signals and a transmitting means for transmitting the video picture signals to the music accompanying apparatus.

3. The control system according to claim 2, wherein the video picture data generating means includes a plurality of video disc devices each of which reproduces the video picture data recorded on a video disc.

4. The control system according to claim 2, wherein the first converting means includes a converter which modulates the video picture data into radio frequency signals corresponding to the video picture signals and superimposes the radio frequency signals each other.

5. The control system according to claim 4, wherein the converter comprises modulators connected to the video picture data generating means and a head amplifier which superimposes the radio frequency signals modulated by the modulators.

6. The control system according to claim 2, wherein the transmitting means includes a coaxial cable through which the video picture signals are transmitted to the music accompanying apparatus.

7. The control system according to claim 6, further comprising a television antenna arranged in the control apparatus, for receiving a television broadcast, the television antenna transmitting the video picture signals corresponding to the television broadcast received thereby to the music accompanying apparatus through the coaxial cable.

8. The control system according to claim 1, further comprising a first memory means arranged in the control apparatus, for storing various music data therein and a second converting means for converting the music data stored in the first memory means into music data signals, wherein the music data signals with the video picture signals are provided for the music accompanying apparatuses by the video picture providing means.

9. The control system according to claim 8, wherein the music data stored in the first memory means includes a song text data, an accompaniment music data and a song tone data.

10. The control apparatus according to claim 9, wherein the music selecting means is utilized for inputting a music number data indicative of the music to be selected.

11. The control system according to clam 10, wherein the music accompanying apparatus further comprises a first control means which transmits the music number data input from the music selecting means to the control apparatus.

12. The control system according to claim 11, wherein the music selecting means comprises a panel switch arranged in the music accompanying apparatus.

13. The control system according to claim 11, wherein the control apparatus reads out the music data stored in the first memory means based on the music number data transmitted from the music accompanying apparatus and transmits the read out music data converted into the music data signals by the second converting means to the music accompanying apparatus.

14. The control system according to claim 13, wherein the first control means in the music accompanying apparatus controls the video picture selecting means based on the song tone data transmitted from the first memory means in the control apparatus so that the video picture selecting means selects the video picture data corresponded to the song tone data.

15. The control system according to claim 14, further comprising;
   a first synthesizing means for synthesizing both the video picture data selected by the video picture selecting means and the song text data in the music data transmitted from the control apparatus, and
   a first video monitor for displaying a video picture and a song text at the same time, based on the video picture data and the song text data synthesized by the first synthesizing means.

16. The control system according to claim 15, wherein the music accompanying apparatus further comprises;
   a first audio amplifier with a microphone connected thereto which mixes both an accompaniment music signal obtained from the accompaniment music data and a voice signal input from the microphone and generates an acoustic signal, and
   a speaker connected to the first audio amplifier which sounds an accompaniment music and a voice based on the acoustic signal from the first audio amplifier.

17. The control system according to claim 2, wherein the video picture providing means continuously transmits the video picture signals to the music accompanying apparatus.

18. The control system according to claim 17, wherein the music accompanying apparatus includes;
   a compact disc player which reproduces a song text data, an accompaniment music data and a song tone data, each being recorded on a compact disc,
   a second memory means for storing a music genre data, a song tone data and a selecting data for selecting one video picture signal among the video picture signals transmitted from the control apparatus,
   a second control means which controls the compact disc player based on a music, selected by the music number selecting means so that the compact disc player reproduces the song text data, the accompaniment music data and the song tone data from the compact disc corresponding to the music number.

19. The control system according to claim 18, wherein the second control means controls the video picture selecting means based on the selecting data reproduced by the compact disc player, thereby the video picture selecting means selects one video picture data among the video picture data transmitted from the control apparatus.

20. The control system according to claim 19, wherein the music accompanying apparatus further comprises;
- a second synthesizing means which synthesizes the video picture data selected by the video picture selecting means and the song text data, and
- a second video monitor which displays a video picture and a song text at the same time thereon, based on a synthesized data from the second synthesizing means.

21. The control system according to 20, wherein the music accompanying apparatus further comprises;
- a second audio amplifier with a microphone connected thereto which mixes both an accompaniment music signal obtained from the accompaniment music data and a voice signal input from the microphone and generates an acoustic signal, and
- a speaker connected to the second audio amplifier which sounds an accompaniment music and a voice based on the acoustic signal from the second audio amplifier.

22. The control system according to claim 17, wherein the first converting means includes a converter which modulates the video picture data into radio frequency signals corresponding to the video picture signals and superimposes the radio frequency signals each other and the transmitting means includes a coaxial cable through which the radio frequency signals are transmitted to the music accompanying apparatus, thereby the radio frequency signals are transmitted from the control apparatus to the music accompanying apparatus through the coaxial cable after modulated and superimposed by the first converting means.

* * * * *